United States Patent
Ryu et al.

(10) Patent No.: US 9,030,305 B2
(45) Date of Patent: May 12, 2015

(54) METHOD FOR EXPRESSING HAPTIC INFORMATION USING CONTROL INFORMATION, AND SYSTEM FOR TRANSMITTING HAPTIC INFORMATION

(75) Inventors: Je-Ha Ryu, Gwangju (KR); Yeong-Mi Kim, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 694 days.

(21) Appl. No.: 13/378,314

(22) PCT Filed: Dec. 3, 2010

(86) PCT No.: PCT/KR2010/008615
§ 371 (c)(1),
(2), (4) Date: Dec. 14, 2011

(87) PCT Pub. No.: WO2011/071275
PCT Pub. Date: Jun. 16, 2011

(65) Prior Publication Data
US 2012/0092146 A1    Apr. 19, 2012

(30) Foreign Application Priority Data
Dec. 11, 2009   (KR) .................. 10-2009-0123532

(51) Int. Cl.
G09B 21/00   (2006.01)
G06F 3/01    (2006.01)

(52) U.S. Cl.
CPC .............. *G09B 21/003* (2013.01); *G06F 3/016* (2013.01)

(58) Field of Classification Search
CPC .................. G06F 3/016; G06F 3/0362; G06F 2203/013–2203/015; G05G 9/047
USPC ......... 340/407.1–407.2; 116/205; 341/20–27, 341/34; 345/173–178; 600/417, 429; 606/1, 606/130
See application file for complete search history.

(56) References Cited

U.S. PATENT DOCUMENTS 5,973,689 A * 10/1999 Gallery .................... 715/859
5,984,880 A * 11/1999 Lander et al. ............. 600/595
(Continued)

FOREIGN PATENT DOCUMENTS

KR   10-2008-0080777 A  *  9/2008 ........... G06F 3/033
WO   WO 2007/117649 A2 * 10/2007 ............. G06F 3/01
(Continued)

*Primary Examiner* — Hai Phan
*Assistant Examiner* — Orlando Bousono
(74) *Attorney, Agent, or Firm* — Nath, Goldberg & Meyer; Joshua B. Goldberg; Katelyn J. Bernier

(57) ABSTRACT

Provided is a method for expressing haptic information using control information, and a system for transmitting haptic information. In the method for expressing haptic information using control information, a tactile video is generated from tactile information for driving a drive array of a tactile device; force feedback data are generated from force feedback information for driving an actuator of a force feedback device; object data are generated to produce a scene descriptor that defines time positions of the tactile video, force feedback data, and multimedia information; and a stream file is generated by encoding the object data and multiplexing the encoded object data. The method comprises: a step of storing control information containing features and specifications of a haptic device including the tactile device and the force feedback device; and a step of expressing information of the scene descriptor through the haptic device with reference to the control information.

10 Claims, 8 Drawing Sheets

(56) References Cited

U.S. PATENT DOCUMENTS

| | | | |
|---|---|---|---|
| 2002/0054060 A1* | 5/2002 | Schena | 345/701 |
| 2003/0120183 A1* | 6/2003 | Simmons | 600/595 |
| 2004/0032395 A1* | 2/2004 | Goldenberg et al. | 345/156 |
| 2004/0240561 A1* | 12/2004 | Crinon | 375/240.26 |
| 2005/0158695 A1* | 7/2005 | Takahashi | 434/113 |
| 2005/0173231 A1* | 8/2005 | Gonzales | 200/5 R |
| 2005/0235032 A1* | 10/2005 | Mason, III | 709/204 |
| 2005/0275967 A1* | 12/2005 | Olien et al. | 360/119 |
| 2006/0149338 A1* | 7/2006 | Flaherty et al. | 607/49 |
| 2006/0167564 A1* | 7/2006 | Flaherty et al. | 623/57 |
| 2006/0189899 A1* | 8/2006 | Flaherty et al. | 600/595 |
| 2006/0206167 A1* | 9/2006 | Flaherty et al. | 607/48 |
| 2006/0255971 A1* | 11/2006 | Kim | 341/34 |
| 2007/0146317 A1* | 6/2007 | Schena | 345/156 |
| 2007/0236449 A1* | 10/2007 | Lacroix et al. | 345/156 |
| 2008/0046122 A1* | 2/2008 | Manzo et al. | 700/245 |
| 2008/0055241 A1* | 3/2008 | Goldenberg et al. | 345/156 |
| 2008/0143693 A1* | 6/2008 | Schena | 345/179 |
| 2009/0062813 A1* | 3/2009 | Prisco et al. | 606/130 |
| 2009/0088774 A1* | 4/2009 | Swarup et al. | 606/130 |
| 2009/0088775 A1* | 4/2009 | Swarup et al. | 606/130 |
| 2009/0175594 A1* | 7/2009 | Ann et al. | 386/95 |
| 2009/0184923 A1* | 7/2009 | Schena | 345/156 |
| 2009/0251439 A1* | 10/2009 | Westerman et al. | 345/175 |
| 2009/0259359 A1* | 10/2009 | Whitton et al. | 701/33 |
| 2009/0295739 A1* | 12/2009 | Nagara | 345/173 |
| 2010/0060604 A1* | 3/2010 | Zwart et al. | 345/173 |
| 2010/0085316 A1* | 4/2010 | Kim | 345/173 |
| 2010/0152899 A1* | 6/2010 | Chang et al. | 700/262 |
| 2011/0141052 A1* | 6/2011 | Bernstein et al. | 345/174 |

FOREIGN PATENT DOCUMENTS

| | | | | |
|---|---|---|---|---|
| WO | WO 2007/129865 A1 * | 11/2007 | | H04N 7/08 |
| WO | WO 2008/108560 A1 * | 9/2008 | | G06F 3/033 |
| WO | WO 2008/108573 A1 * | 9/2008 | | G06F 3/03 |

* cited by examiner

FIG. 5

| MovieTexture [ #%NDT=SFWorldNode, SFTextureNode, SFStreamingNode ||||
|---|---|---|---|
| exposedField | SFBool | loop | FALSE |
| exposedField | SFFloat | speed | 1.0 |
| exposedField | SFTime | startTime | 0 |
| exposedField | SFTime | stopTime | 0 |
| exposedField | MFURL | url | [] |
| field | SFBool | repeatS | TRUE |
| field | SFBool | repeat | TRUE |
| eventOut | SFTime | duration_changed | |
| eventOut | SFBool | isActive | |
| ] { ||||
| } ||||

FIG. 6

```
Group {
        TactileDisplay {
                texture MovieTexture {
                        url "tactile_video.avi"
                        startTime 3
                        stopTime 7
                }
        }
}
```

FIG. 7

```
TactileDisplayTexture [ #%NDT=SFWorldNode,  SFStreamingNode
exposedField    SFBool      loop        FALSE
exposedField    SFTime      startTime   0
exposedField    SFTime      stopTime    0
exposedField    MFURL       url         []
eventOut        SFBool      isActive
}
```

FIG. 8

```
TactileDisplayTexture [ #%NDT=SFWorldNode,  SFStreamingNode
exposedField    SFBool      loop        FALSE
exposedField    SFTime      startTime   0
exposedField    SFTime      stopTime    0
exposedField    MFURL       url         []
eventOut        SFBool      isActive
}
```

FIG. 9

```
HapticSurface {
    exposedField    SFFloat         stiffness           0.1
    exposedField    SFFloat         staticFriction      0.1
    exposedField    SFFloat         dynamicFriction     0.1
    exposedField    SFTextureNode   bumpTexture         NULL
    exposedField    SFDynamicSurface dynamicSurface     NULL
}
```

FIG. 10

```
Movement {
    exposedField    SFBool      loop            FALSE
    exposedField    SFTime      startTime       0.0
    exposedField    SFTime      stopTime        0.0
    field           SFTime      samplingTime    0.001
    field           MFVec3f     position        []
    field           MFRotation  orientation     []
    field           MFVec3f     force           []
    field           MFVec3f     torque          []
    eventOut        SFBool      isActive
}
```

METHOD FOR EXPRESSING HAPTIC INFORMATION USING CONTROL INFORMATION, AND SYSTEM FOR TRANSMITTING HAPTIC INFORMATION

This is a National Phase Application filed under 35 U.S.C. §371 as a national stage of PCT/KR2010/008615, filed on Dec. 3, 2010, an application claiming the benefit under 35 U.S.C. §119 of Korean Patent Application No. 10-2009-0123532, filed on Dec. 11, 2009, the content of each of which is hereby incorporated by reference in its entirety.

TECHNICAL FIELD

The present invention relates to haptic technology, and more particularly to an expression method and transmission system for haptic information, in which tactility is added to audio-video multimedia to give a user a sense of reality.

BACKGROUND ART

Conventional audio-video based standards such as moving picture expert group (MPEG) and the like have been in progress, but they purely focus upon visual and aural senses, and thus a user cannot be immersed therein through tactility. Although some haptic technology has been applied to mobile phones, medical equipment, games, and the like, there are lots of technical problems to be overcome before application of the haptic technology to audio-video streams. Therefore, there is difficulty applying the haptic technology to audio-video streams and various virtual environments, such as films, television programs, and the like.

DISCLOSURE

Technical Problem

The present invention is directed to solving such problems of the related art and provides a method for expressing haptic information, in which haptic effects are suitably provided to an audio-video stream, thereby offering more realistic multimedia to a user.

The present invention also provides a system for transmitting haptic information, in which haptic effects are suitably provided to an audio-video stream, thereby offering more realistic multimedia to a user.

The technical problems of the present invention are not limited to the foregoing problems, and other technical problems will be clearly understood by those skilled in the art from the following description.

Technical Solution

An aspect of the invention provides a method for expressing haptic information using control information, which includes generating tactile video from tactile information for driving a driver array constituting a tactile device, generating force feedback data from force feedback information for driving an actuator constituting a force feedback device, generating object data to produce a binary format for scenes (BIFS) that sets up time locations of the tactile video, the force feedback data and multimedia information, encoding the object data, and generating a stream file by multiplexing the encoded information. The improvement includes: storing control information containing features and specifications of a haptic device including the tactile device and the force feedback device; and expressing information of the BIFS through the haptic device with reference to the control information.

Another aspect of the invention provides a system for transmitting haptic information using control information, which includes a unit for generating a tactile video from tactile information for driving a driver array constituting a tactile device, a unit for generating force feedback data from force feedback information for driving an actuator constituting a force feedback device, a unit for generating object data to produce a binary format for scenes (BIFS) that sets up time locations of the tactile video, the force feedback data and multimedia information, a unit for encoding the object data, and a unit for generating a stream file by multiplexing the encoded information. The improvement includes: a unit for storing control information containing features and specifications of a haptic device including the tactile device and the force feedback device; and a unit for expressing information of the BIFS through the haptic device with reference to the control information.

DESCRIPTION OF DRAWINGS

FIG. 5 is a view of one example of a MovieTexture node of a binary format for scenes (BIFS) in MPEG-4;

FIG. 6 is a view of a TactileDisplay node for expressing tactile information;

FIG. 7 is a view of a tactile video object defined by connecting the TactileDisplay node and the MovieTexture node;

FIG. 8 is a view of TactileDisplayTexture node for expressing tactile information;

FIGS. 9 and 10 are views of a Kinesthetic node for expressing the force feedback information;

MODE FOR INVENTION

Figure 1:
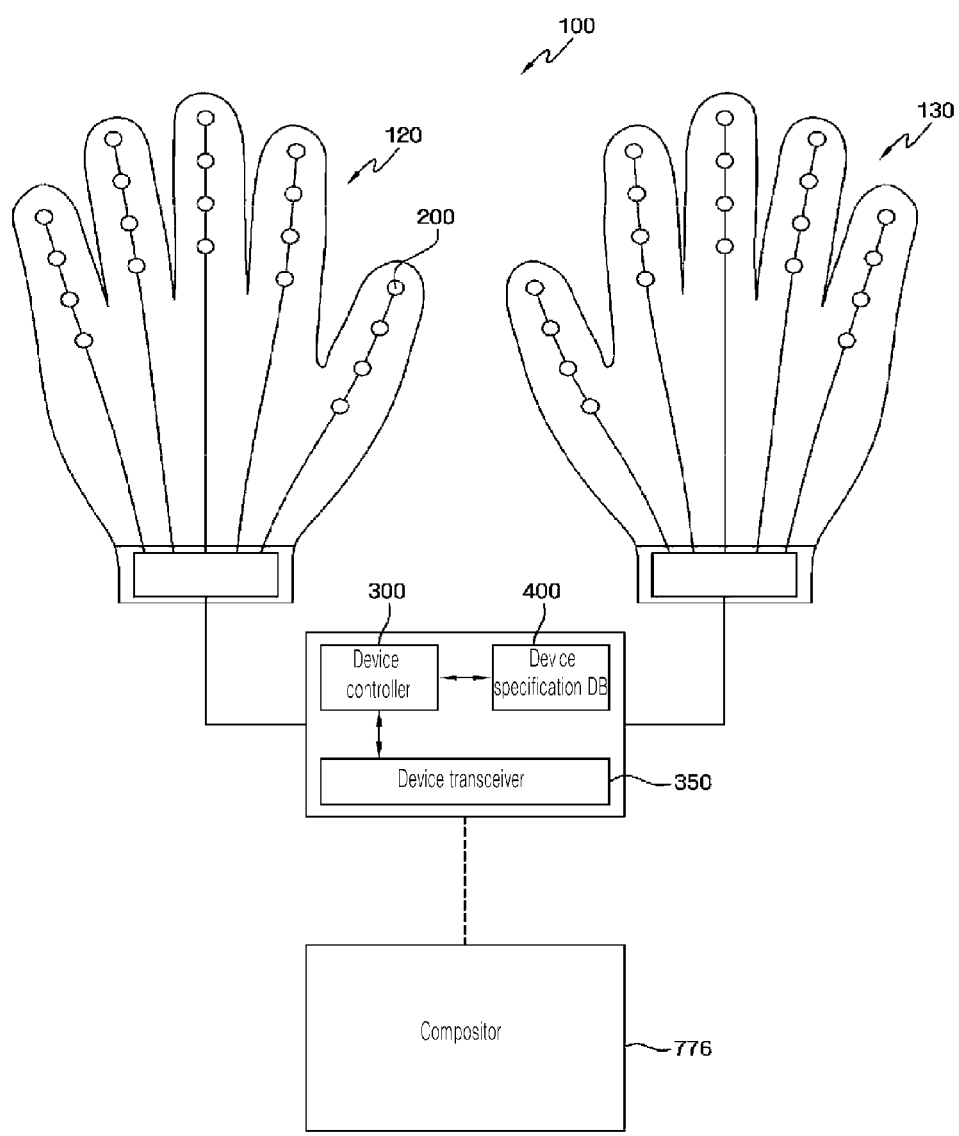
FIG. 1 is a view of a tactile device with a driver according to one exemplary embodiment of the present invention.

The above and other aspects, features, and advantages of the invention will become apparent from the following detailed description of exemplary embodiments in conjunction with the accompanying drawings. It should be understood that the present invention is not limited to the following embodiments and may be embodied in different ways, and that the embodiments are provided to provide complete disclosure of the invention and to provide a thorough understanding of the invention to those skilled in the art. The scope of the invention is limited by the accompanying claims and equivalents thereof. Like elements will be indicated by like reference numerals throughout the specification.

It will be understood that when an element is referred to as being "on" another element or layer, it can be directly on the other element or layer, or intervening elements may also be present. In contrast, when an element is referred to as being "directly on" another element or layer, there are no intervening elements present. As used herein, the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention.

The terminology is used herein for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups.

Unless otherwise defined, all terms (including technical and scientific terms) used herein have the same meaning as commonly understood by those skilled in the art to which the present invention pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Spatially relative terms, such as "under", "below", "lower", "over", "upper" and the like, may be used herein for ease of description to describe one element or feature's relationship to another element(s) or feature(s) as illustrated in the drawings. It will be understood that spatially relative terms are intended to encompass different orientations of the device in use or operation in addition to the orientation depicted in the figures. For example, if elements in the drawings are inverted, the elements described as "below" or "beneath" other elements or features would then be oriented "above" the other elements or features. Thus, the exemplary term "below" or "beneath" can encompass both orientations of "above" and "below". The elements may be otherwise oriented (rotated 90 degrees or at other orientations) and spatially relative terms used herein may be interpreted accordingly.

Figure 2:
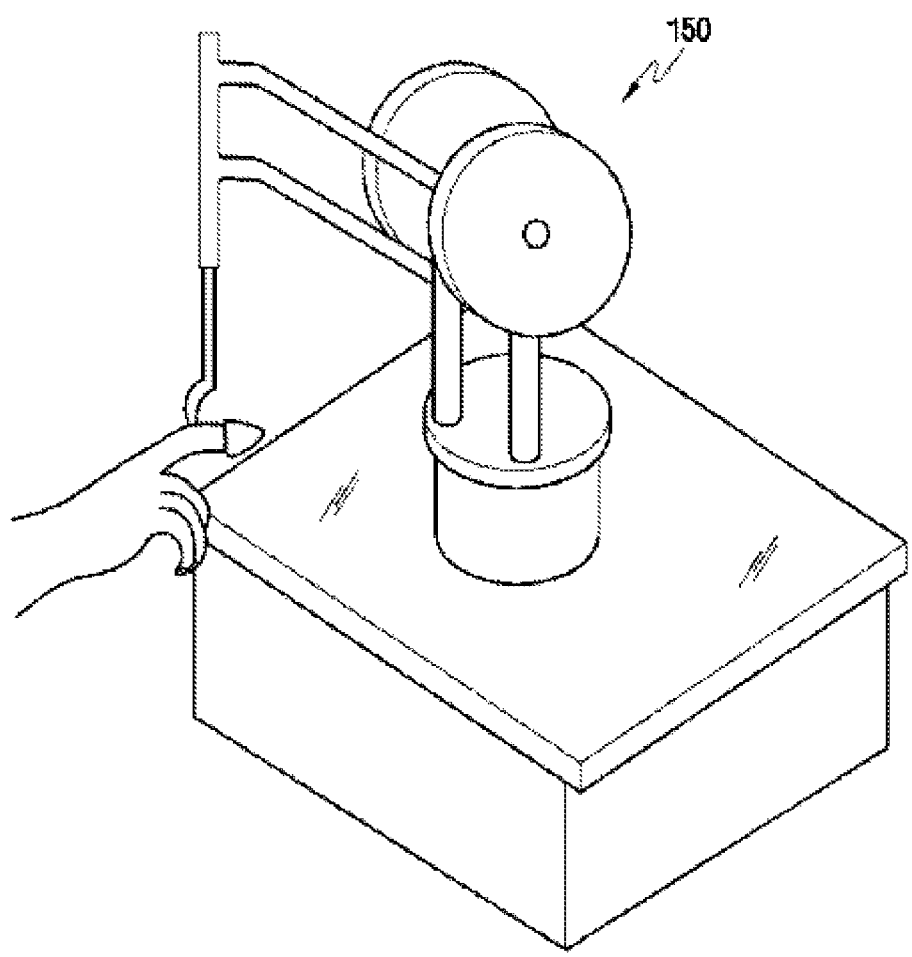
FIG. 2 is a perspective view of a force feedback device providing force feedback information according to one exemplary embodiment of the present invention.

FIG. 1 is a view of a tactile device with a driver and FIG. 2 is a view of a force feedback device.

Referring to FIGS. 1 and 2, a tactile device 100 includes tactile providers 120, 130, drivers 200, and a device transceiver 350, and a device specification database (DB) 400. Also, a force feedback device 150 may include a plurality of actuators (not shown) which provide force feedback information to a user.

Haptic is broadly divided into tactility corresponding to haptic information such as vibration, heat and electric current, and force feedback corresponding to haptic information such as force, torque and hardness. A device for providing tactility is a tactile device, and a device for providing force feedback is a force feedback device. The tactile device and the force feedback device will be collectively called a haptic device.

The tactile providers include left/right tactile providers 120, 130 and are provided with a plurality of drivers 200. The tactile providers 120, 130 are realized in the form of gloves so that a user can wear the tactile providers. However, the tactile provider is not limited to the form of gloves, and may be realized in various ways. According to the form for providing tactility, the tactile provider 120, 130 may be realized not only by gloves or shoes, but also by a hat to be put on the head or other articles to be attached to the arm, leg, back, waist, etc.

The drivers 200 are arranged on the tactile provider 120, 130 and may implement by vibrotactile stimulation, pneumatic tactile stimulation, and the like. For vibrotactile stimulation, the drivers may include an eccentric motor, a linear motor, a voice coil motor, an ultrasonic motor, a piezoelectric device, and the like. For pneumatic tactile stimulation, the drivers may have a nozzle structure or pneumatic membrane structure to supply air.

A device controller 300 serves to control the drivers 200. The device controller 300 receives a drive signal generated from a main controller (not shown) in a compositor 776, and controls operations of the drivers 200 in response to the drive signal.

The device transceiver 350 transmits and receives a control signal for controlling the device and delivers it to the device controller 300.

The device specification DB 400 serves to store information about the tactile/force feedback devices 100, 150. The force feedback device 150 providing force, torque, and the like, and the tactile device 100 providing vibration, heat, electric current, and the like are collectively called haptic devices. That is, the device specification DB 400 stores information about the haptic devices 100, 150.

For the tactile device 100, the device specification DB 400 stores the kind of tactile device, a unit corresponding to tactility provided by the tactile device, maximum/minimum strength provided by the tactile device, the number of drivers horizontally arranged on the tactile device, the number of drivers vertically arranged on the tactile device, a space in a horizontal direction between the drivers, a space in a vertical direction between the drivers, a maximum renewal drive percentage, and the number of strength levels provided by the tactile device.

For the force feedback device 150, the device specification DB 400 stores maximum/minimum force/torque/hardness, degrees of freedom, and units and workspaces for the maximum/minimum force/torque/hardness. Here, degrees of freedom means that translational/rotational motion is independently allowable in X/Y/Z directions, and the workspace refers to a range in which the force feedback device can perform translational motion and rotational motion. With regard to the range in which the force feedback device can perform translational motion and rotational motion, a maximum range where the force feedback device can be translated along X/Y/Z axes may be defined in mm, and also a maximum range in which the force feedback device can be rotated in the X/Y/Z axes may be defined as an angle of roll/pitch/yaw. However, units are not limited to these units.

A tactile video 600, force feedback data and binary format for scenes (BIFS) information mapped corresponding to media (video, audio) information are subjected to a resizing process in consideration of device specifications stored in the device specification DB 400, and provide tactility/force feedback. Details related to these components will be described below.

Further, the compositor 776 is provided therein with the main controller (not shown) which generates a signal for controlling the driver 200 of the tactile device 100, and a main transceiver which transmits a control signal of the main controller to the device transceiver 350 of the tactile device 100.

The main controller generates a control signal for controlling each of the drivers 200 and transmits the control signal to the device controller 300 through the main transceiver and the device transceiver 350, and the device controller 300 controls the respective drivers 200 to be driven based on the control signals. Here, the main transceiver and the device transceiver 350 may be connected to each other through wired or wireless communication.

Each driver 200 may be controlled by specifying drive strength. Therefore, information about drive strength of each of the drivers 200 is transmitted to the device controller 300 to provide tactile information to a user. The main controller transmits the information about drive strength of each driver to the device controller, in which the strength information about the drive strength of each driver is transmitted to the main controller in the form of tactile video in this embodiment. The main controller may transmit each pixel value to the device controller 300 by changing the drive strength when each frame of the tactile video is changed.

Figure 3:
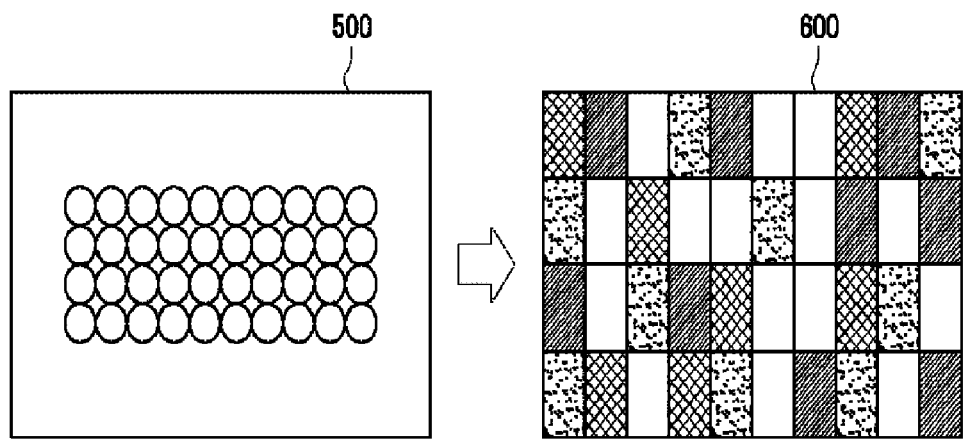
FIG. 3 is a view of a driver array and tactile video corresponding thereto according to one exemplary embodiment of the present invention.

FIG. 3 is a view of a driver array and a tactile video corresponding thereto according to one exemplary embodiment of the present invention.

Referring to FIG. 3, each of the left tactile provider 120 and the right tactile provider 130 is provided with 4×5 drivers, and the driver array 500 may be expressed by a total of 4×10 drivers, in which pixels corresponding to the respective drivers constitute the tactile video 600.

Each pixel of the tactile video 600 includes intensity information of the pixel, and the intensity information corresponds to drive strength of a driver corresponding to that pixel. If the tactile video 600 is expressed in as grayscale video, each pixel has intensity information of 0 to 255. The drivers 200 are driven based on this information. For example, a certain driver corresponding to a white pixel is driven strongly and a certain driver corresponding to a black pixel is vibrated weakly.

If the driver array 500 of the tactile device 100 corresponds one-to-one to the pixel of the tactile video 600, intensity information of each pixel may correspond one-to-one to drive strength of each driver 200. However, if the dimension of the tactile video 600 is larger than that of the driver array 500, resizing may be performed depending on the ratio. That is, if there is a difference between required tactile information and implementable tactile information, the device controller 300 may perform resizing.

Resizing is performed by the device controller 300 based on the device specifications stored in the device specification DB 400. For example, if the tactile video 600 has a dimension of 320×240 and the driver array 500 of the tactile device has a dimension of 10×4, the tactile video 600 of 320×240 pixels is adjusted to that of 10×4 pixels so as to correspond one-to-one to the driver array 500. At this time, the intensity information of the adjusted tactile video may be shown by averaging the intensity information of the pixels before adjusting the dimension.

The tactile video 600 is the same as a general color or black-and-white format and thus may be transmitted by a general video encoding and decoding method. Further, the tactile video 600 includes a plurality of frames, and the intensity information of the pixels in each frame corresponds to drive strength of the respective drivers 200 of the tactile providers.

For force feedback, motion of a tool manipulated by an expert in the workspace and having 3 or 6 degrees of freedom is stored. To store the motion and force of the expert, a robot arm equipped with the tool used by the expert is used. Each joint of the robot arm is provided with an encoder to obtain position data of the tool, and it is also possible to acquire force/torque applied to the tool by the expert through a force/torque sensor attached to the tool. Then, the force feedback data for applying force feedback becomes a series of position data and force data, and contains time at which each data is sampled.

Likewise, the device controller 300 may perform resizing based on information of the force feedback device 150 stored in the device specification DB 400. That is, if there is a difference between the required force feedback information and implementable force feedback information, the device controller 300 may perform resizing. For example, in the case where it is necessary to provide information of motion of 1 m in an X-axial direction but a half of a desired workspace for certain equipment is allowed for the equipment actually employed by a user, the scales of all motion information are resized by half in each of the X, Y and Z axial directions and then provided to the user. Also, in the case where the force feedback device 150 must provide a force of 10 N to a user in the X-axis direction but the actual force feedback device 150 can only provide a force of 5 N in the X-axis direction, the magnitude of force provided by the force feedback device 150 may be adjusted depending upon a ratio therebetween.

Further, according to user preference, for example, a user may dislike a temperature of 30° C. or higher and may not want an electric current of 0.5 mA or more. Also, a user may dislike a force of 5N or higher.

The user preferences may have priority over the device specification information. Therefore, in the event where the transmitted tactile information is 10 N and is adjusted to 5 N in consideration of the device specification, the haptic device may provide 3 N to a user, if the user preference is 3 N. As a result, the haptic information of 10 N is resized to 3 N.

Figure 4:
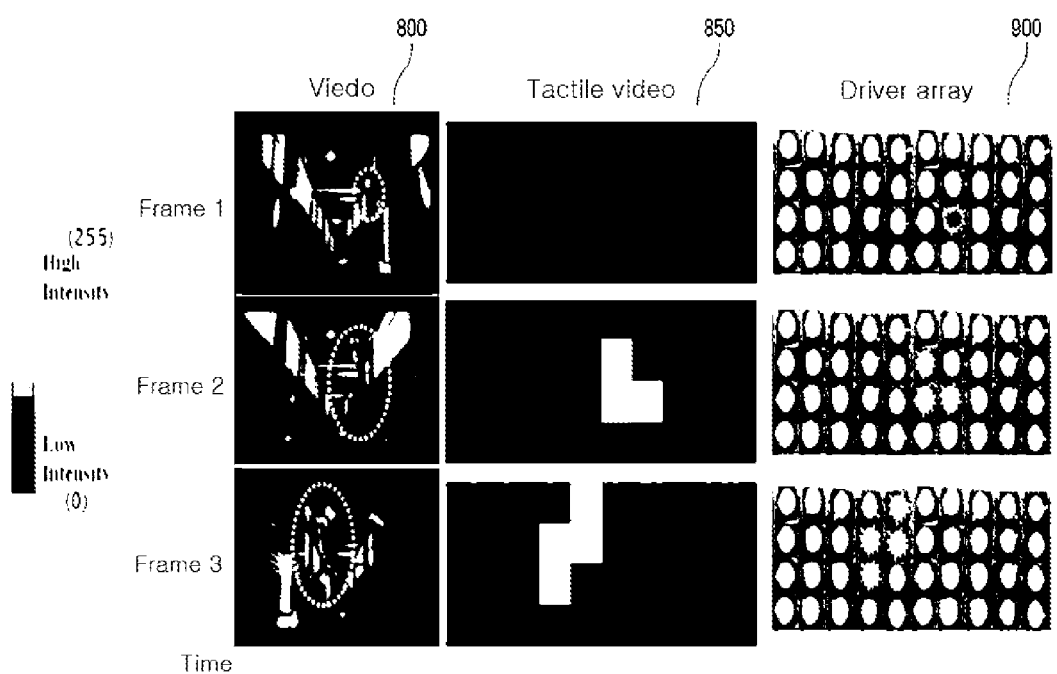
FIG. 4 is a view of one example of tactile video generated based on a video.

FIG. 4 is a view of one example of a tactile video generated based on a video.

Referring to FIG. 4, a movie corresponding to tactile video 850 generated as a tool for editing/producing tactility is placed at the right of an image of a movie, and a tactile video corresponding driver array 900 is placed at the right of the tactile video 850. The tactile video 850 generates tactility corresponding to a certain scene through the tactile editing/producing tool based on the video/audio information by applying different tactile strength (0~255) to each frame and accurately making up the number of video frames.

The generated tactile video is reproduced in accordance with the device specification. Specifically, the tactile video is reproduced not only in accordance with the size of the device but also in accordance with tactile strength which can be reproduced by the device. For example, in the case where the tactile video is provided by 256 steps and the device can reproduce only 8 steps, the tactile video is reproduced according to 8 steps obtained by dividing 256 steps into the 8 steps.

As shown in the figure, the scene shows that an actor jumps from the right to the left. FIG. 4 shows one example wherein this actor's motion is transmitted as tactility to a user from a third person's point of view. The tactile video may be produced based not only on a third person's point of view but also on the first person's point of view or a tactile background effect point of view. In the first frame, when the actor starts jumping, the tactile video is mapped with black and the driver array provides weak tactility corresponding to the mapping color. In the last frame, at the moment when the actor lunges to the left, the tactile video is mapped with white and thus the driver array provides strong tactility.

FIG. 5 is a view of one example of a MovieTexture node of a binary format for scenes (BIFS) in MPEG-4. Node tactile information is transmitted together with general media (audio and video) information. Next, a node structure, and a method and system for transmitting tactile information expressed by tactile video together with media information will be described.

In MPEG-4, information for expressing an object is transmitted through a plurality of elementary streams (ES). Further, interrelationship and link information between the elementary streams are transmitted by an object descriptor defined in MPEG-4.

To compose a scene based on MPEG-4, an initial object descriptor (IOD), a binary format for scenes (BIFS), an object descriptor, and media data are generally needed. The IOD is information to be transmitted first to compose a scene based on MPEG-4, which describes a profile and level of each media, and includes an ES descriptor about a BIFS stream and an object descriptor stream.

The object descriptor is a set of ES descriptors that describe information about respective media data composing the scene, which provides connection between the ES and the BIFS of each media data. Here, the BIFS is information that describes how the respective objects are spatio-temporally related to one another.

In MPEG-4, the BIFS is provided with a MovieTexture node that defines a video object.

Referring to FIG. 5, in the MovieTexture node, startTime indicates a start time of playing a video, and stopTime indicates a stop time of playing the video. Accordingly, it is possible to synchronize video with a different object. Also, url sets up a location of the video.

To transmit tactile video using the MovieTexture node of the BIFS, TactileDisplay node is defined.

FIG. 6 is a view of a TactileDisplay node for expressing tactile information, and FIG. 7 is a view of a tactile video object defined by connecting the TactileDisplay node and the MovieTexture node.

Referring to FIGS. 6 and 7, the TactileDisplay node of FIG. 5 is a kind of texture node. In FIG. 6, a "url" field shows a location of tactile video, a "startTime" field shows a start time, and a "stopTime" field shows a stop time. That is, one tactile video object is defined by connecting the MovieTexture node to the texture field of the TactileDisplay node.

In one example of FIG. 6, a tactile video set as "tactile_video.avi" is played in the tactile providers from 3 to 7 seconds after being played.

FIG. 8 is a view of a TactileDisplayTexture node for expressing tactile information.

Referring to FIG. 8, the TactileDisplayTexture node is newly defined for transmitting tactile video in the BIFS based on MPEG-4 of FIG. 7. The TactileDisplayTexture node defines the start and stop time of playing a tactile video file, and the "url" field shows a location of the tactile video file.

FIGS. 9 and 10 are views of a Kinesthetic node for expressing the force feedback information. Like the tactile node described above, FIGS. 9 and 10 may define an object of force feedback data.

Figure 11:
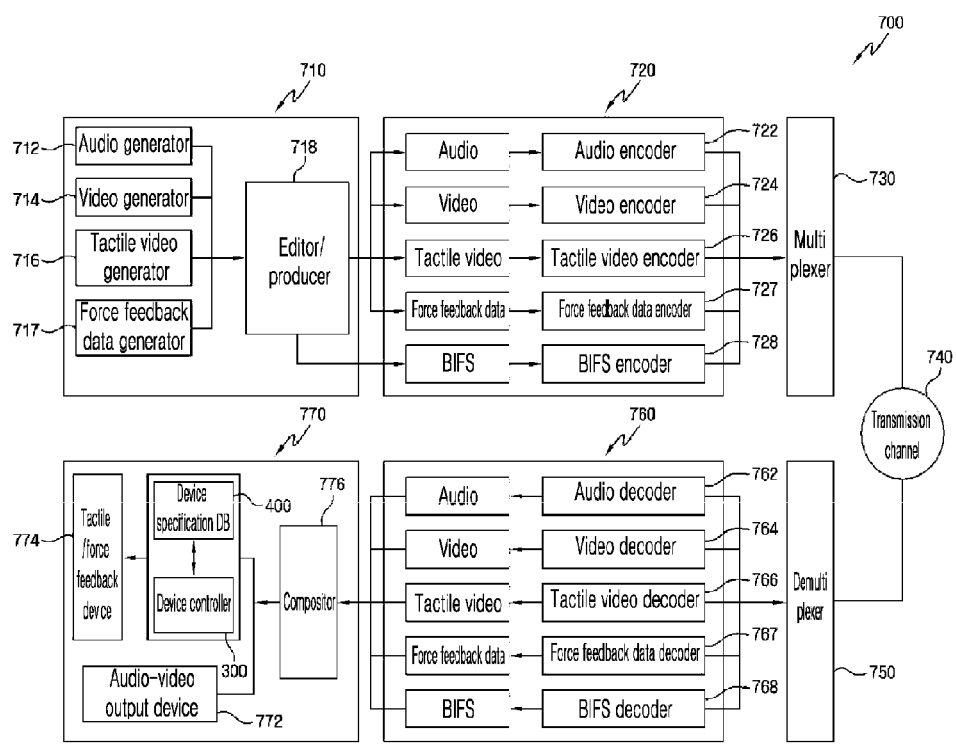
FIG. 11 is a block diagram of the system for transmitting haptic information according to one exemplary embodiment of the present invention.

FIG. 11 is a block diagram of a system for transmitting haptic information according to one exemplary embodiment of the present invention.

In FIG. 11, a tactile information transmission system includes an object data generator 710, an encoder unit 720, a multiplexer (MUX) 730, a transmission channel 740, a demultiplexer (DEMUX) 750, a decoder unit 760, and a player 770.

The object data generator 710 serves to generate media (audio and video), and generate and edit or produce tactile video and force feedback data corresponding to the media. An audio generator 712 serves to store or generate an audio, and a video generator 714 serves to store or generate video. A tactile video generator 716 serves to generate tactile video expressing the drive strength of the driver array based on the audio and video. Further, the force feedback data generator 717 generates force feedback data related to force, torque, and the like based on the audio and video.

In the tactile video generator 716, the tactile video may be automatically generated in accordance with the kind of audio or video information, or may be directly generated by a user based on the audio or video.

The tactile video generated by the tactile video generator 716 and the force feedback data generated by the force feedback data generator 717 are edited and produced together with the media (audio and video) information by an editor/producer, and placed in accordance with the corresponding time axis. Accordingly, the editor/producer generates the BIFS in accordance with spatio-temporal locations of the audio, video, tactile video and feedback data.

The encoder unit 720 serves to encode the audio, video, tactile video, feedback data and BIFS. The audio is encoded by an audio encoder 722, and the video is encoded by a video encoder 724. Meanwhile, the tactile video corresponds to a kind of black-and-white video, and therefore can be encoded by a general video encoding method, which is encoded by a tactile video encoder 726. The force feedback data is encoded by a force feedback data encoder 727. Also, the BIFS is encoded by a BIFS encoder 728. Such encoding is realized by an MPEG-4 audio and video encoding method. The information encoded by the encoder unit 720 is multiplexed into one MP4 file by the multiplexer, and then transmitted through the transmission channel 740. However, such an encoding method is not limited to the MPEG-4 audio and video encoding method.

In this embodiment, the transmission channel 740 should be construed as a concept of covering a wired/wireless communication network, which may include an Internet protocol (IP) network, a digital multimedia broadcasting (DMB) communication network, the Internet, and the like.

The MP4 file transmitted through the transmission channel 740 is demultiplexed by the demultiplexer 750 and decoded by the decoder unit 760 according to information. An audio decoder 762 decodes audio, a video decoder 764 decodes video, a tactile video decoder 766 decodes tactile video, a force feedback data decoder 767 decodes force feedback data, and a BIFS decoder 768 decodes BIFS.

The information decoded by the decoder unit 760 is played in the player 770. The player 770 includes a compositor 776, an audio-video output device 772, and a haptic providing device. The compositor 776 spatio-temporally composes objects such as transmitted audio, video, tactile video, force feedback data, etc., based on the BIFS information. On the basis on this information, the audio-video output device 772 outputs audio and video information, and a tactile device 774 provides tactile information through the driver array. Also, the force feedback data offers force feedback information through the force feedback device 774.

The haptic providing device includes the tactile/force feedback device 774, the device specification DB 400, and the device controller 300. As mentioned above, the device specification DB 400 stores information about specifications of the tactile/force feedback device 774, and the device controller 300 controls the tactile/force feedback device 774 to provide haptics (tactility/force feedback) using transmitted tactile video information and force feedback data based on the device specification. Here, the device specification, that is, information containing the features and specifications of the device, may be manually and/or automatically stored in the device specification DB by the controller.

Figure 12:
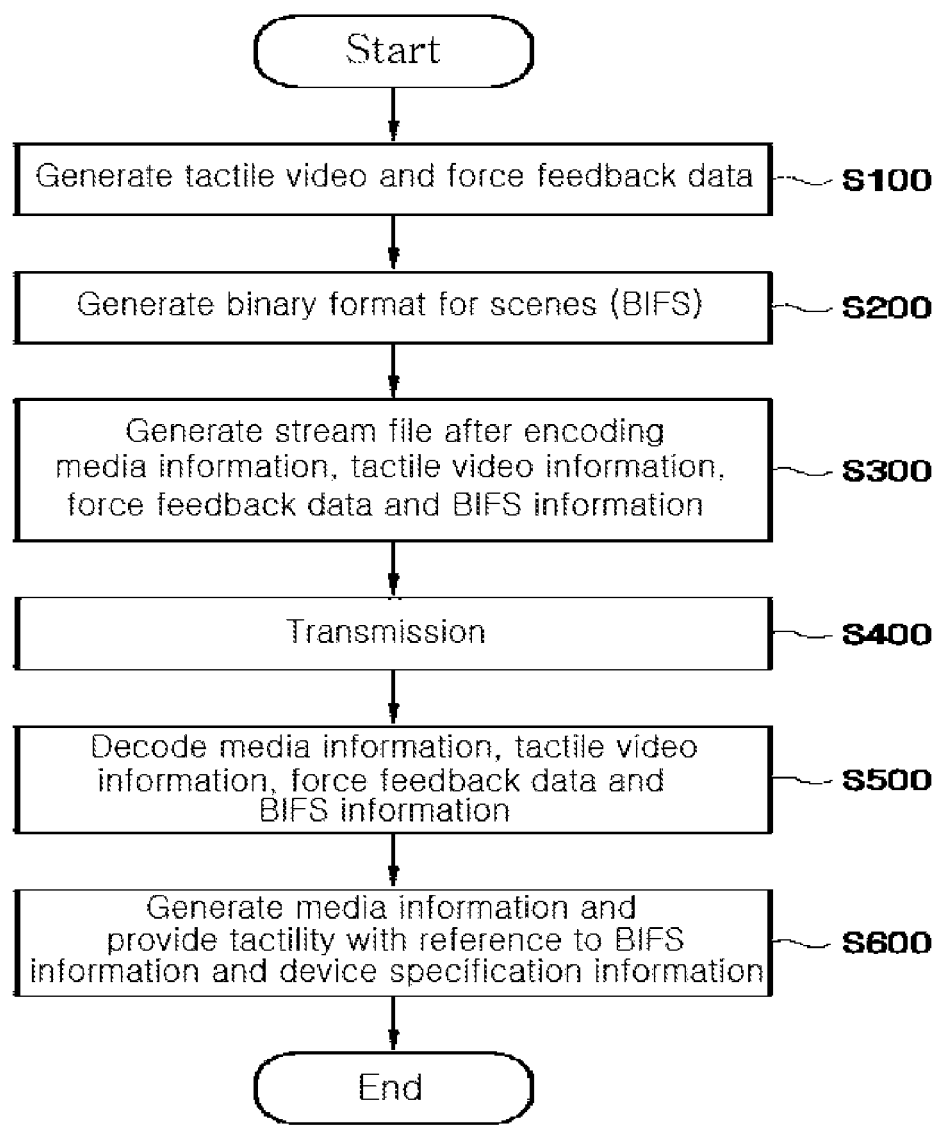
FIG. 12 is a flowchart of a method for transmitting haptic information according to one exemplary embodiment of the present invention.

FIG. 12 is a flowchart of a method for transmitting haptic information.

Referring to FIG. 12, the tactile video generator first generates tactile video based on media information such as audio, video, etc., and the force feedback data generator generates force feedback data (S100).

Each pixel of the tactile video includes an intensity value showing the drive strength for each driver of the driver array in the tactile device. Such tactile video may be automatically or manually generated based on audio or video.

The force feedback data may be divided into an active mode and a passive mode from the viewpoint of a user (or a viewer). For the passive mode, motion of a tool manipulated by an expert in a workspace and having 3 or 6 degrees of freedom is stored to generated force feedback data containing a series of position data and force data for playing the force feedback. Then, when a user wears the haptic devices, the generated force feedback information is transmitted to a user.

For the active mode, a virtual object haptic characteristic value (e.g., hardness and texture of a sofa) may be automatically or manually generated.

In the editor/producer, the tactile video and force feedback data are placed in accordance with media information and time axis. The editor/producer generates BIFS containing information about spatio-temporal locations of the media information, tactile video and force feedback data (S200).

The BIFS contains a texture node for the tactile video and force feedback data. The texture node for the tactile video and force feedback data involves a startTime field and a stopTime field for the output of tactile video and force feedback data, and a url field for showing the locations of the tactile video and force feedback data.

The media information, tactile video information, force feedback data and BIFS information are encoded by the encoder unit and generated as a stream file through the multiplexer (S300).

The generated stream file is transmitted through the transmission channel (S400).

A transmission method of the stream file should be construed as a concept covering a wired/wireless communication network, which may include an IP network, a DMB communication network, the Internet, etc.

The transmitted stream file is demultiplexed by the demultiplexer and then decoded by the decoder unit (S500).

With reference to the BIFS information and the device specification information, the media information is generated and haptics is provided (S600).

The compositor spatio-temporally composes audio, video, tactile video and force feedback data based on the BIFS information, in which the audio and the video are output from the audio-video output device, and the tactile information is provided in the tactile device. Also, the force feedback data is provided in the force feedback device. Through the resizing process considering the intensity of each pixel of the tactile video and the device specification, each driver of the driver array is driven. Also, through the resizing process considering the force feedback information and the device specification, the force feedback device is driven.

Although some embodiments have been described herein, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

The invention claimed is:

1. A method for expressing haptic information using control information comprising:
generating tactile video from tactile information for driving a driver array constituting a tactile device,
generating force feedback data from force feedback information for driving an actuator constituting a force feedback device,
generating object data to produce a binary format for scenes (BIFS) that sets up time locations of the tactile video, the force feedback data, and multimedia information,
encoding the object data,
generating a stream file by multiplexing the encoded object data,
storing the control information and user preferences, wherein the control information contains features and specifications of a haptic device, which is comprised of the tactile device and the force feedback device;
performing resizing of the tactile information and/or the force feedback data based on the control information, wherein the user preferences have priority over the control information, and
expressing information of the BIFS through the haptic device with reference to the control information.

2. The method of claim 1, wherein the control information comprises the number of drivers horizontally arranged in the driver array, the number of drivers vertically arranged in the driver array, a space in a horizontal direction between drivers, and a space in a vertical direction between the drivers.

3. The method of claim 1, wherein the control information comprises maximum force provided by the actuator to each axis, maximum torque provided by the actuator to each axis, maximum hardness provided by the actuator to each axis, a degree of freedom of the actuator, and a workspace of the actuator.

4. The method of claim 1, wherein the control information is referred to when required tactile information is resized to implementable tactile information if there is a difference between the required tactile information mapped to the generated tactile video and the implementable tactile information of the drivers.

5. The method of claim 1, wherein the control information is referred to when required force feedback information is resized to implementable force feedback information if there is a difference between the required force feedback information constituting the generated force feedback data and the implementable force feedback information of the actuator.

6. A system for transmitting haptic information using control information comprising:
a unit for generating tactile video from tactile information for driving a driver array constituting a tactile device,
a unit for generating force feedback data from force feedback information for driving an actuator constituting a force feedback device,
a unit for generating object data to produce a binary format for scenes (BIFS) that sets up time locations of the tactile video, the force feedback data, and multimedia information,
a unit for encoding the object data, a unit for generating a stream file by multiplexing the encoded object data, a device specification unit for storing the control information and user preferences, wherein the control information contains features and specifications of a haptic device, which is comprised of the tactile device and the force feedback device;

a device controller for performing resizing of the tactile information and/or the force feedback data based on the control information, wherein the user preferences have priority over the control information, and a unit for expressing information of the BIFS through the haptic device with reference to the control information.

7. The system of claim 6, wherein the control information comprises the number of drivers horizontally arranged in the driver array, the number of drivers vertically arranged in the driver array, a space in a horizontal direction between drivers, and a space in a vertical direction between the drivers.

8. The system of claim 6, wherein the control information comprises maximum force provided by the actuator to each axis, maximum torque provided by the actuator to each axis, maximum hardness provided by the actuator to each axis, a degree of freedom of the actuator, and a workspace of the actuator.

9. The system of claim 6, wherein the control information is referred to when required tactile information is resized to implementable tactile information if there is a difference between the required tactile information mapped to the generated tactile video and the implementable tactile information of the drivers.

10. The system of claim 6, wherein the control information is referred to when required force feedback information is resized to implementable force feedback information if there is a difference between the required force feedback information constituting the generated force feedback data and the implementable force feedback information of the actuator.

* * * * *